United States Patent
Niki et al.

[11] Patent Number: 5,996,744
[45] Date of Patent: Dec. 7, 1999

[54] SHOE GAP ADJUSTING DEVICE FOR DRUM BRAKE

[75] Inventors: Hajime Niki; Takashi Ikeda; Kazuyuki Matsuishi; Hiroo Nakagawa, all of Nagoya, Japan

[73] Assignee: Nisshinbo Industries, Inc., Tokyo, Japan

[21] Appl. No.: 08/978,426

[22] Filed: Nov. 25, 1997

[30] Foreign Application Priority Data

Dec. 4, 1996 [JP] Japan .................................. 8-323872

[51] Int. Cl.⁶ ...................................................... F16D 65/38
[52] U.S. Cl. ..................................... 188/79.62; 188/196 D
[58] Field of Search ............................ 188/79.56, 79.57, 188/79.58, 79.62, 106 F, 196 D, 343, 364

[56] References Cited

U.S. PATENT DOCUMENTS 3,842,621 10/1974 Mazziotti ................................. 464/171
4,535,875 8/1985 Ingram et al. ......................... 188/106 F
4,702,354 10/1987 Ingram et al. ....................... 188/196 D

FOREIGN PATENT DOCUMENTS 62-242141 9/1993 Japan .

Primary Examiner—Robert J. Oberleitner
Assistant Examiner—Melanie Talavera
Attorney, Agent, or Firm—Young & Thompson

[57] ABSTRACT

A shoe gap adjusting device includes a piston for pressing a brake shoe through a piston head, having a projecting end part with a boot cover for protecting an elastic boot that seals an end part of a cylinder body. A shoe gap adjusting ring is fitted on the end part of the piston in a non-rotatable manner. A elastic piece at the inner periphery of the cover axially extends through a cut-out in the ring and elastically supports the outer peripheral surface of the head so that the piston head is elastically attached to the piston. A tool can be inserted through an opening and engaged with an outer peripheral cut-out of the ring, for rotating the ring relative to a bolt and performing an adjustment of the shoe gap. The device simultaneously allows the protection for the elastic boot and realization of rotational operability of the shoe gap adjusting ring by the tool.

8 Claims, 6 Drawing Sheets

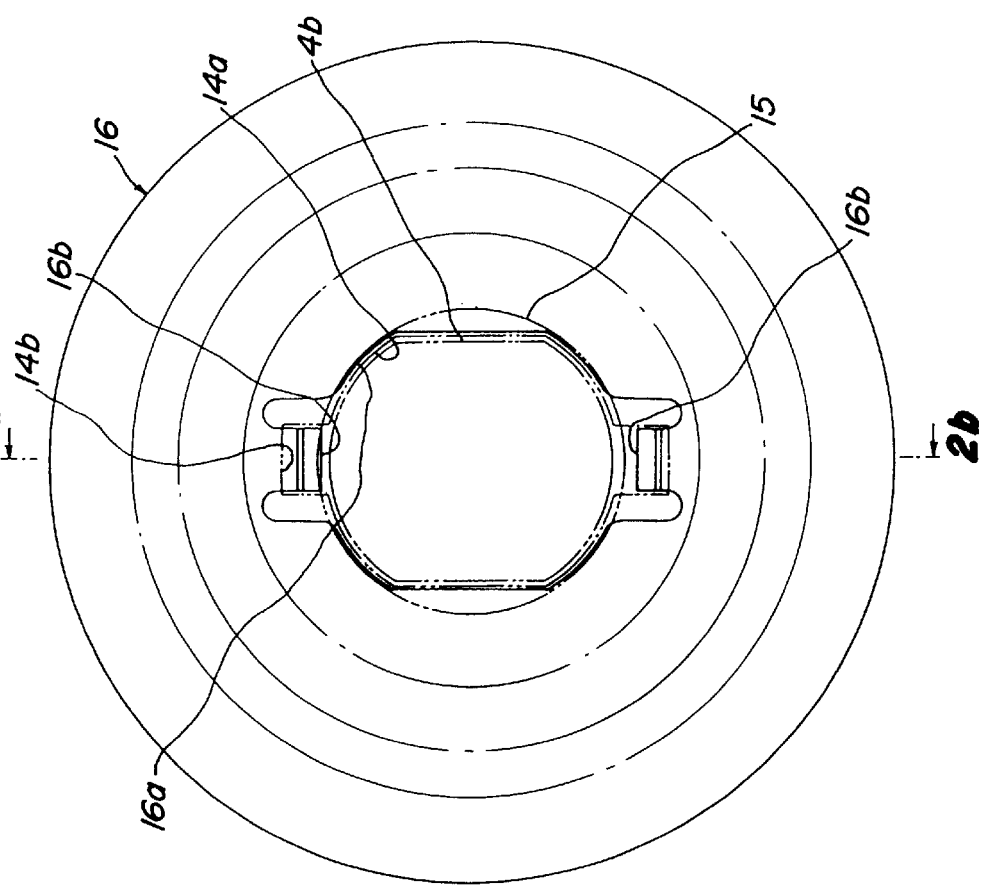

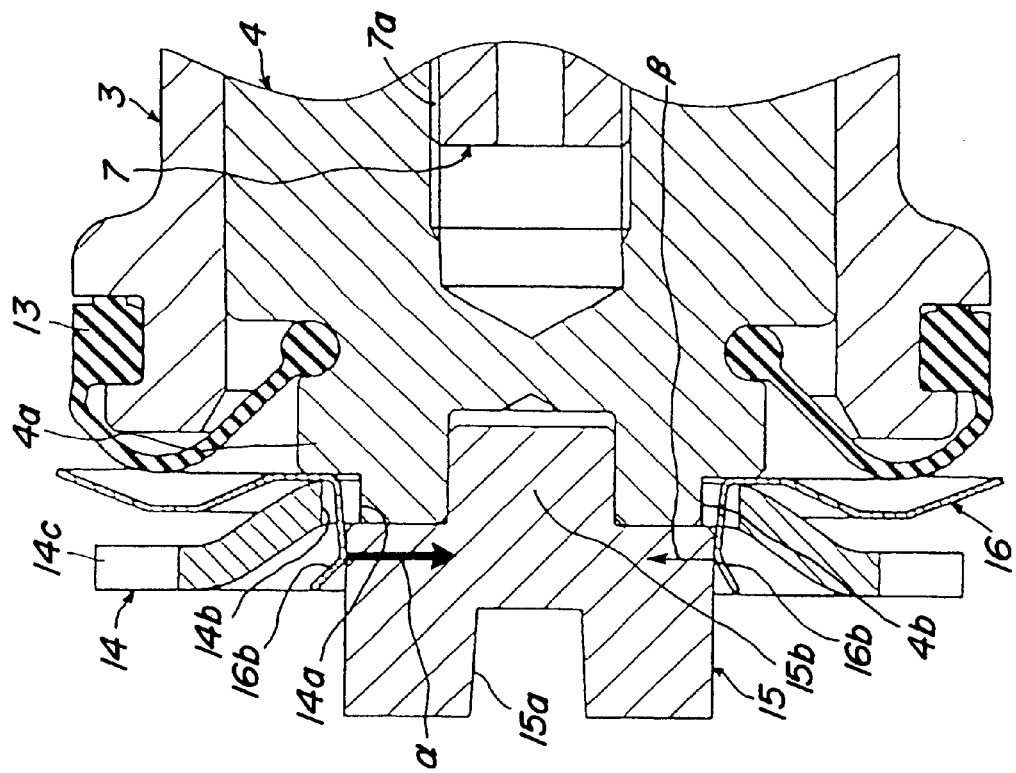
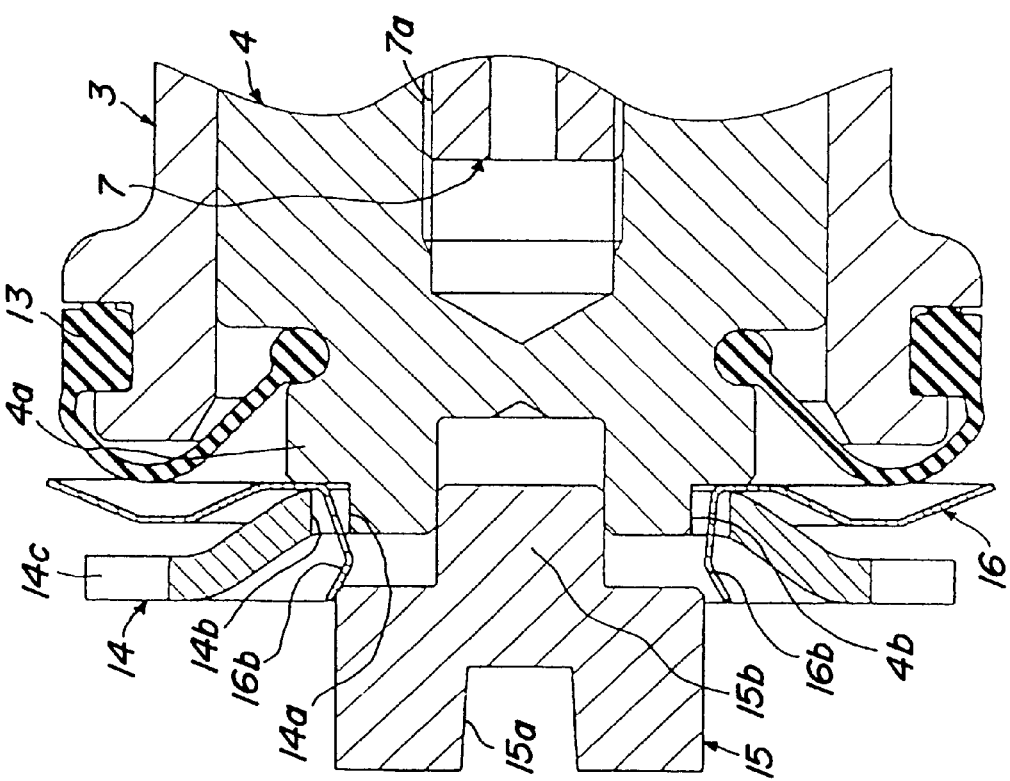

FIG_6 PRIOR ART
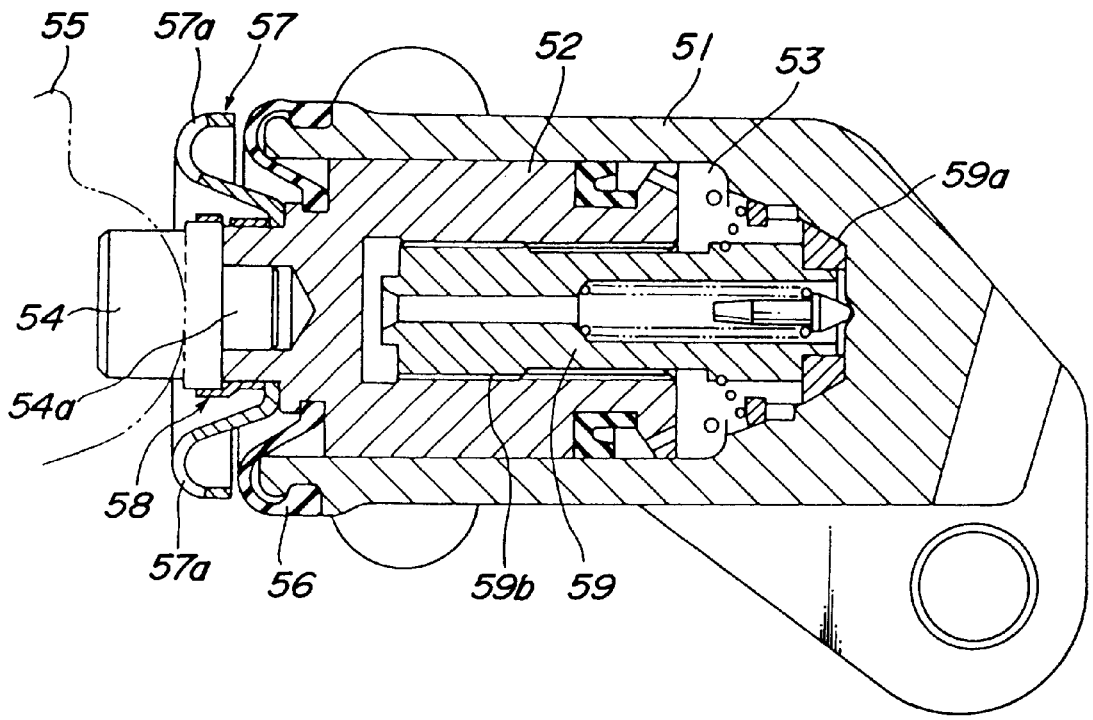
FIG_7 PRIOR ART
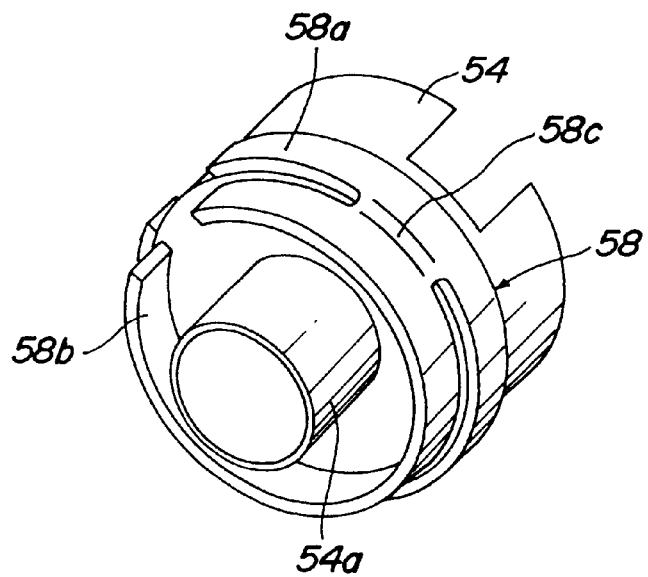

SHOE GAP ADJUSTING DEVICE FOR DRUM BRAKE

BACKGROUND OF THE INVENTION

The present invention relates to a shoe gap adjusting device for a drum brake, which is manually operated.

A conventional shoe gap adjusting device which is relevant to the present invention is known and disclosed, for example, in Japanese Patent Examined Publication No. 5-65,734.

This patent document discloses a conventional shoe gap adjusting device as illustrated in FIGS. 6 and 7, which is comprised of a stationary cylinder body 51 and a brake actuating piston 52 as shown in FIG. 6.

The brake actuating piston 52 is slidably fitted in the cylinder body 51, and adapted to be extended and retracted by feeding and discharging a brake fluid pressure into and from a pressure chamber 53. The piston 52 presses a brake shoe through the intermediary of a shoe engaging member 54, leftward as seen in FIG. 6, so as to effect a braking action upon extension by the feed of the brake fluid pressure. Meanwhile, the piston 52 is retracted by the force of a return spring which acts upon the brake shoe 55 so as to return the brake shoe 55 to its original position, in order to release the braking upon discharge of the brake fluid.

By the way, an opening is formed in the cylinder body 51, and one end part of the piston 52 is projected through the opening. This opening is covered with an elastic boot 56 for dust-proof and water-proof measures. Further, a shoe gap adjusting ring 57 is arranged adjacent to the opening in the cylinder body 51.

The shoe gap adjusting ring 57 also serves as a protecting member for protecting the elastic boot 56 from being damaged, and is arranged adjacent to the elastic boot 56 for covering the latter while it is fitted in the projecting end part of the piston 52 and prevented from rotation. Further, the ring 57 is formed therein with a cut-out groove 57*a* which serves to receive a tool for rotating the same.

The shoe engaging member 54 is fitted with the front end face of the projecting end part of the piston in a form-locking manner so as to be relatively rotatable as shown at 54*a*. The shoe engaging member 54 is elastically attached to the projecting end part of the piston 52 through the intermediary of a clip 58 fitted to the projecting end part of the piston 52, in order to prevent the shoe engaging member 54 from coming off and being lost.

The clip 58 grips the shoe engaging member 54 as particularly shown in FIG. 7, and has an annular shape. Specifically, the clip 58 is comprised of an annular elastic support piece 58*a* for gripping the shoe engaging member 54, an annular elastic piece 58*b* adapted to be elastically fitted on the projecting end part of the piston 52 so as to prevent the shoe gap adjusting ring 57 from coming off, as well as a connecting part 58*c* bridging between these pieces 58*a*, 58*b*.

Upon adjustment of the shoe gap, which is required for replacement of the brake shoes or the like, a minus screw driver or the like tool is inserted from outside of a drum brake. After the tip end of the tool has been engaged in the cut-out groove 57*a* of the shoe gap adjusting ring 57, the shoe gap adjusting ring 57 is rotated by the tool.

At this stage, the piston 52 is pressed by the elastic force of the shoe return spring, through the intermediary of the shoe engaging member 54, toward right as seen in FIG. 6. The conical tip end face 59*a* of the adjusting bolt 59 threaded into the piston 52 inhibits rotation of the adjusting bolt 59 through the frictional contact with the cylinder body 51.

Thus, the rotation of the shoe gap adjusting ring 57 causes the rotation of the piston 52 only, and the shoe gap can be adjusted by the action of the threaded part 59*b* therebetween, in association with the rotation of the piston 52 relative to the adjusting bolt 59.

By the way, the larger the cut-out groove 57*a*, the easier the work in which the tip end of the tool is engaged in the cut-out groove 57*a* of the shoe ring adjusting ring 57. In the above-mentioned conventional shoe gap adjusting device, however, since the shoe gap adjusting ring 57 also serves as a protecting member for the elastic boot 56, if the cut-out groove 57*a* formed therein is excessively large, the elastic boot 56 is apt to be damaged by the tool thereby giving rise to a tendency that the protecting function for the elastic boot 56 becomes insufficient.

On the contrary, should the size of the cut-out groove 57*a* be small in order to sufficiently protect the elastic boot 56, the engagement of the tip end part of the tool into the cut-out groove 57*a* becomes more difficult, and this results in such a problem that the shoe gap adjustment becomes more difficult.

For overcoming the above-mentioned problems, it may be considered that an additional protecting member for protecting the elastic boot 56 is interposed between the elastic boot 56 and the shoe gap adjusting ring 57, in order to allow the shoe gap adjusting ring 57 to eliminate the necessity of the provision of the protecting function for the elastic boot 56.

However, it has been confirmed that the above-mentioned measure is not practical since an additional component is required as the protecting member for the elastic boot, giving rise to disadvantage in terms of added cost in combination with increased number of components.

Further, in the above-mentioned conventional device, the clip 58 for elastically fitting the shoe engaging member 54 in the piston 52 is substantially complicated in shape so that the disadvantage in terms of cost has been unavoidable.

DISCLOSURE OF THE INVENTION

The present invention has been conceived in order to eliminate the above-mentioned problem.

Accordingly, it is a primary object of the present invention to improve the shoe gap adjusting device and realize a compromise between a facilitated engagement of the tip end of a tool in the shoe gap adjusting ring, and a positive protection of the elastic boot without increasing the number of components.

To this end, the present invention provides a shoe gap adjusting device for a drum brake which comprises:

a shoe pressing member incorporated in a cylinder body and having a projecting end part adapted to extend from an adjacent opening in the cylinder body for pressing a brake shoe and effecting a braking action;

an elastic boot covering between the projecting end part of the shoe pressing member and the opening in the cylinder body;

a protecting member for protecting the elastic boot, provided for the projecting end part of the shoe pressing member adjacent to the elastic boot;

a shoe engaging member non-rotatably engaged with the brake shoe, and abutting against and journalled by a tip end face of the projecting end part of the shoe pressing member so as to be relatively rotatable;

a shoe gap adjusting ring provided in the tip end of the projecting end part of the shoe pressing member, so as to be manually rotated for changing an angular position of the shoe pressing member relative to the cylinder body and thereby adjusting the shoe gap;

said shoe pressing member being elastically supported by a elastic support piece which is formed integrally with the protecting member.

The present invention is particularly featured by a unique arrangement wherein the shoe engaging member is elastically supported by the elastic piece which is formed integrally with the protecting member. With such an arrangement, it is possible to eliminate such a necessity that the shoe adjusting ring protects the elastic boot. Thus, even though the tool cut-out formed in the shoe adjusting ring is increased in size for facilitating engagement of the tip end of the tool therein, the elastic boot can be effectively protected from being damaged by the tool since the protection for the elastic boot can be ensured by the protecting member.

Accordingly, the present invention serves to simultaneously satisfy two contrary requirements, that is, a requirement for a facilitated engagement of the tip end of a tool in the tool cut-out of the shoe gap adjusting ring, and a requirement for a sufficient protecting function for the elastic boot.

Further, the tip end of the tool can be engaged in the tool cut-out of the shoe gap adjusting ring while it is in contact with, and caused to slide along the protecting member, and such an engagement can be achieved without visual confirmation. Thus, it is possible to further facilitate engagement of the tip end of the tool in the tool cut-out of the shoe gap adjusting ring.

Also, even though the protecting member for the elastic boot is the one independent from the shoe gap adjusting ring, the elastic piece for elastically supporting the shoe engaging member is formed integrally with the protecting member so that the number of components is not increased as whole. Further, no disadvantage in terms of cost is caused since the elastic piece can be formed with the molding of the protecting member, and it is thus possible to more practically solve the problem.

Moreover, the elastic piece for elastically supporting the shoe engaging member may have a tongue-like shape to axially project from the protecting member. It has been confirmed that there is no difficulty in the molding of the protecting member, and it is possible to avoid increase in terms of cost due to the molding of the protecting member.

Advantageously, the shoe gap adjusting ring is fitted on the tip end of the projecting end part of the said shoe pressing member in a non-rotating manner, and the shoe gap adjusting ring has a detent fitting hole with a cut-out through which the elastic piece of the protecting member extends to a elastically supporting position of the shoe engaging member. In this instance, it is possible to realize the attaching structure of the shoe gap adjusting ring, which is simple and inexpensive. Further, the elastic piece can be extended to the elastically supporting position of the shoe engaging member by the shortest distance, and it is thus possible to minimize the occupying space thereof.

Preferably, the shoe engaging member is fitted with the tip end face of the projecting end part of the shoe pressing member in a form-locking manner so as to be relatively rotatable and radially positioned such that a radial pressing force exerted by the elastic piece of the shoe pressing member is increased in a predetermined radial direction. In this instance, the frictional force of the form-locking fitting part can be increased, so that the holding force of the shoe engaging member with respect to the projecting end part of the shoe pressing member makes it possible to prevent the shoe gap adjusting ring and the protecting member from coming off.

There may be formed a recess in the outer peripheral surface of the shoe engaging member, for receiving the elastic piece of the protecting member therein. In this instance, it is possible to further increase the holding force of the shoe engaging member by the elastic piece.

Advantageously, at least one of the shoe gap adjusting ring and the protecting member is secured to the projecting end part of the shoe pressing member. In this instance, at least the protecting member can be handled so as to be integrally formed with the shoe pressing member before the shoe engaging member is attached to the projecting end part of the shoe pressing member. Further, it can be handled in such a condition that the shoe gap adjusting ring and the protecting member are both attached together, and the shoe engaging member is attached to the shoe pressing member.

The shoe pressing member may comprise a brake actuating piston which is slidably fitted in said cylinder body. In this instance, it is possible to exhibit the various functional advantages even in a drum brake in which the shoe is pressed directly by the piston so as to perform the braking action.

Alternatively, the shoe pressing member may comprise a shoe gap adjusting bolt threaded into a brake actuating piston which is slidably fitted in said cylinder body. In this instance, it is possible to exhibit the various functional advantages even in a drum brake of a type wherein the brake shoe is pressed by the piston 4 through the intermediary of the shoe-adjusting bolt 7 so as to effect a braking action.

The device according to the present invention may further comprise an automatic shoe gap adjusting mechanism incorporated in the cylinder body. In this instance, it is possible to exhibit the various functional advantages even in a drum brake which incorporates the automatic shoe gap adjusting mechanism.

BRIEF DESCRIPTION OF THE DRAWINGS

FIG. 2a is a front view showing a boot cover for protecting the elastic boot;

FIG. 2b is a longitudinal sectional view taken along the line 2b—2b and seen in the direction of arrow in FIG. 2a;

FIG. 3a is a fragmentary sectional view, in enlarged scale, of the characteristic part in the shoe gap adjusting device according to a variant form of the first embodiment, and showing a condition just after a piston head is fitted in a piston;

FIG. 3b is a sectional view similar to FIG. 3a, showing a condition in which the fitting of the piston head has been completed;

FIG. 6 is a longitudinal sectional view showing a wheel cylinder attaching part of a drum brake incorporating the above-mentioned conventional shoe gap adjusting device; and FIG. 7 is a perspective view showing a condition wherein a elastic clip for the piston head in the conventional shoe gap adjusting device grips the piston head.

DETAILED DESCRIPTION OF THE PREFERRED EMBODIMENT

Figure 1:
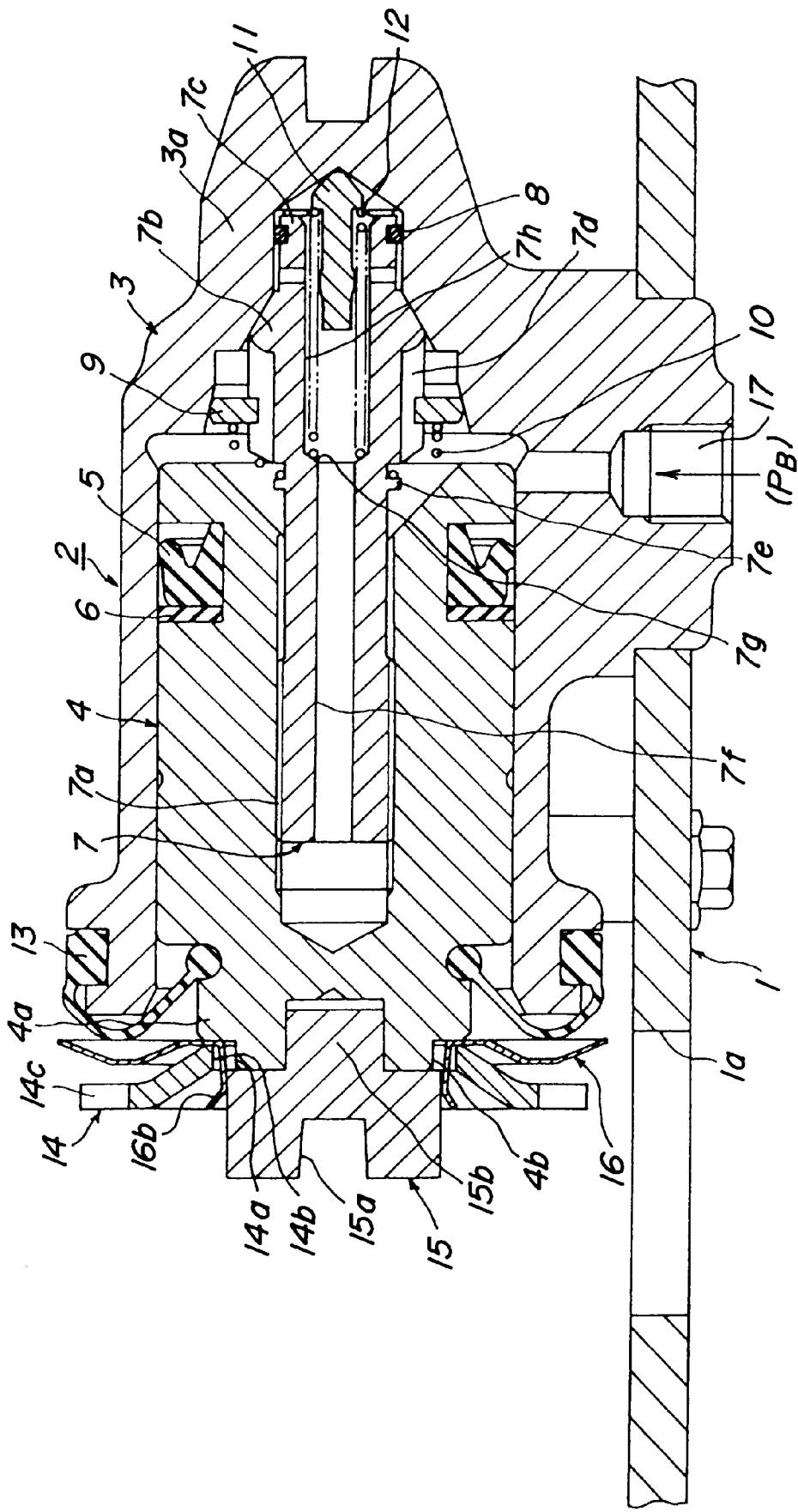
FIG. 1 is a longitudinal sectional view showing a wheel cylinder attaching part of a drum brake incorporated in a shoe gap adjusting device according to a first embodiment of the present invention.

The present invention will now be explained in further detail hereinafter, with reference to preferred embodiments shown in the accompanying drawings, wherein FIGS. 1 and 2 show a shoe gap adjusting device for a drum brake according to a first embodiment of the present invention.

As shown in FIG., 1, there is shown a back plate 1 of a drum brake which is fixed to a stationary part of a vehicle body, not shown. The back plate 1 is formed with an opening 1a for receiving therethrough a tool such as a screw driver, during manual adjustment of the shoe gap. The opening 1a is normally blocked by a plug which is not shown.

A one-end opened type wheel cylinder 2 for effecting braking action is provided in the drum brake, and has a cylinder body 3 which is secured to the back plate 1 by bolts or the like. A shoe pressing member in the form of a brake actuating piston 4 is slidably fitted in the cylinder body 3. A piston cap 5 is interposed between the sliding part of the piston 4 and the cylinder body 3. A back-up ring 6 is provided, for preventing the base part of the piston cap 5 from being caught.

An adjusting bolt 7 is provided, which extends axially to project into a chamber defined between the piston 4 and a blocked end 3a of the cylinder body 3. The adjusting bolt 7 is threadedly connected into the piston 4 through an irreversible thread 7a.

It is noted that the irreversible thread 7a exhibits a unique thread-connection between the piston 4 and the adjusting bolt 7, wherein they are prevented from rotation relative to each other even when an axial thrust force is exerted thereto. Such a relative rotation would otherwise be caused by an ordinary thread-connection by which an axial thrust would be converted into rotation.

A conical part 7b is formed in the adjusting bolt 7 in the vicinity of the tip end part thereof on its side remote from the piston 4. The conical part 7b is adapted to be pressed into a corresponding conical surface in the closed end 3a of the cylinder body 3 so as to prevent rotation of the adjusting bolt 7 during the non-operative state of the brake.

The conical end part 7b of the adjusting bolt 7 has a tip end 7c which is fitted in an associated hole in the closed end 3a of the cylinder body 3 with an O-ring 8 interposed therebetween. Such an arrangement serves to effectively prevent vibration of the adjusting bolt 7.

The barrel part of the adjusting bolt 7 has an outer peripheral surface formed with multi-threads 7d having a large lead, on the side of the conical part 7b which is remote from the tip end 7c. A drive ring 9 is reversibly thread-connected with the multi-threads 7d, at its inner periphery. The outer peripheral surface is formed in a conical shape so as to be frictionally engaged with an opposed conical surface of the closed end 3a of the cylinder body 3. Further, the drive ring 9 is urged toward the conical surface of the closed end 3a of the cylinder body 3 by means of a coil spring 10 which is seated at a flange part 7e of the adjusting bolt 7.

The reversible thread-connection between the multi-threads 7d and the drive cylinder 9 exhibits a unique relationship wherein an axial displacement of one of the members causes the other member to rotate, and vise versa.

Whether the thread-connected part is reversible as such or irreversible as in the thread 7a, is to be determined by the thread pitches and the frank angle of the threads, as well as frictional coefficients of both members.

Further, a center stepped hole 7f is formed in the center part of the adjusting bolt 7 so as to extend therethrough. The stepped hole 7f has a stepped part 7g which defines a large diameter portion 7h extending from the stepped part 7g on the side adjacent to the tip end 7c. Further, a locator 11 is inserted into the large diameter portion 7h so that a coil spring 12 is compressed between the locator 11 and the stepped part 7g and provides an increased rotational resistance to the irreversible thread 7a of the adjusting bolt 7.

The open end of the cylinder body 3 is covered with an elastic boot 13 which is made of an elastic material, such as rubber. The elastic boot 13 is arranged between the cylinder body 3 and the projecting end part 4a of the piston 4, to thereby prevent intrusion of dust, muddy water or the like foreign matters into the cylinder body 3.

The projecting end part 4a of the piston 4 is provided with a shoe gap adjusting ring 14, which serves to adjust the shoe gap in a manner to be explained hereinafter, as well as a piston head 15 as a shoe engaging member and a boot cover 16 as a protecting member for protecting the elastic boot 13.

The piston head 15 is formed, in its one end, remote from the piston 4a, with a groove 15a through which a brake shoe enters. The other end of the piston head 15 is formed with a form-locking part 15b for allowing redial positioning of the piston head 15 with reference to the projecting end face of the piston 4 and a relative rotation therebetween.

The shoe gap adjusting ring 14 is formed of a metal ring having a center in the noncircular opening 14a as indicated by the double-dotted chain line in FIG. 2a, and fitted on the non-circular tip end 4b as also indicated by the double-dotted chain line in FIG. 2a. Thus, the shoe gap adjusting ring 14 is fitted onto the projecting end of the piston 4 in a non-rotatable manner. Further, the piston head 15 serves to prevent the shoe gap adjusting ring 14 from coming off.

In order to elastically attach the piston 15 to the piston 4 so as to be prevented from coming off therefrom, a boot cover 16 is interposed between the elastic boot 13 and the shoe gap adjusting ring 14. The boot cover 16 is constructed as shown in FIGS. 2a and 2b.

Specifically, the boot cover 16 is formed in a dish-like shape from a metal sheet as a raw material, as shown in FIG. 1, similar to the sectional shape of the elastic boot 13, for protecting the elastic boot 13 as the main object of the present invention.

Further, the boot cover 16 is formed with a center hole 16a which is adapted to be fitted on the non-circular tip end 4b of the piston 4 in a non-rotatable manner. The center hole 16a has the same non-circular shape as that of the end 4b. Further, the boot cover 16 is integrally provided with a pair of elastic pieces 16b which are axially extended toward the piston head 15 from the center hole 16a and arranged diametrically opposite to each other.

The elastic pieces 16b are engaged with the outer peripheral surface of the piston head 15 so as to integrate the shoe gap adjusting ring 14, the piston head 15 and the boot cover 16 with one another. The elastic pieces 16b also serve to journal the piston head 15 so as to be rotatable relative to the piston 4 in a condition in which it abuts against the piston 4.

It is noted here that the number of the elastic pieces 16b is not limited to a specific value. Thus, the number may be one, or three or more.

It is further noted that the elastic pieces 16b are extended to the outer peripheral surface of the piston head 15 through cut-outs 14b which are formed in the inner peripheral surface defining the non-circular hole 14a of the shoe gap adjusting ring 14.

The shoe gap adjusting ring 14 is formed along its outer periphery with several tool engaging cut-outs 14c, as shown in FIG. 1. The tip end of a tool inserted through the opening 1a in the back plate 1 is engaged in the cut-outs 14c, as shown in FIG. 1, thereby allowing a manual rotation of the ring 14.

The operation of the drum brake incorporating the shoe gap adjusting device according to the above-mentioned first embodiment will be explained below.

In a non-operating condition of the brake, when a hydraulic brake pressure $P_B$ is fed through a port 17, the piston 4 is pushed leftward as seen in FIG. 1. Through the leftward movement of the piston 4, the piston head 15 presses the brake shoe in the same direction. As a result, the brake shoe is pressed against the inner peripheral surface of the brake drum so as to effect a predetermined braking action.

When a manual shoe gap adjustment is required as a result of replacement of the brake shoes or the like, the tool is inserted into the opening 1a and engaged at its tip end into the cut-out 14c so as to rotate the ring 14.

At this time, the piston head 15 is inhibited from rotation, by the brake shoe engaged in the groove 15a of the piston head 15. Further, the force of the return spring for the brake shoe presses the conical part 7b of the adjusting bolt 7 against the closed end 3a of the cylinder body 3 through the intermediary of the piston 4, so as to inhibit rotation of the adjusting bolt 7.

Accordingly, the rotation of the ring 14 causes the rotation of the piston 4 only, so that the piston 4 is axially displaced relative to the adjusting bolt under the threading action of the irreversible thread-connection part 7a. Thus, it is possible to adjust the position of the piston 4 relative to the piston body 3, and thereby adjust the shoe gap.

In the next place, explanation will be made of an automatic adjustment of the shoe gap. Upon the above-mentioned braking, the piston 4 and the adjusting bolt stroke together toward the left as seen in FIG. 1. Should the shoe gap become large due to wear so that the degree of the stroke of the piston 4 and the adjusting bolt 7 exceeds a predetermined play gap (or the degree of backlash) of the irreversible thread part 7d, the frictional force between the conical outer peripheral surface of the drive ring 9 and the corresponding conical surface of the closed end 3a of the cylinder body 3 decreases so that the drive ring 9 becomes rotatable. Accordingly, the drive ring 9 can be rotated by the spring force of the coil spring 10 along the thread inclination of the reversible thread engaging part 7d.

Further, when the braking is released, the piston 4 and the adjusting bolt 9 are retracted toward the non-operative position by the shoe return spring. At this time, the piston 4 and the adjusting bolt 7 are integrally retracted by the degree of the play gap (or degree of backlash) of the reversible thread engaging part 7d. Subsequently, however, the drive ring 9 wedges into the corresponding conical surface of the closed end 3a of the cylinder body 3. Accordingly, the adjusting bolt 7 is returned while it is rotated until the conical part 7b of the adjusting bolt 7 abuts against the corresponding conical surface of the closed end 3a of the cylinder body 3.

As a result, the irreversible thread engaging part 7a of the adjusting bolt 7 is also rotated, so that the piston 4 is advanced by a distance which corresponds to the degree of wear of the brake shoe, thereby making it possible to adjust the shoe gap.

It is noted that, as shown in FIG. 3a, one of the pair of elastic pieces (e.g., the upper elastic piece 16b in FIG. 3a) is formed so as to extend radially inward by a length which is longer than the radially inward extension of the other elastic piece 16b, in a free condition. By this, a large force can act upon the piston head 15 in a vertical direction in FIG. 3, as differently indicated in FIG. 3b by a thick vector α and a thin vector β (i.e., α>β). Accordingly, the frictional force at the form-locking fitting part 15b of the piston head 15 become lager, and the holding force of the piston head 15 with respect to the piston 4 is sufficiently large to prevent the shoe gap adjusting ring 14 and the boot cover 16 from coming off.

For example, although the first embodiment shown in FIGS. 1 to 3 relates to an example wherein the shoe gap adjusting device according to the present invention is incorporated to a wheel cylinder of a one end open type, the present invention may also be applied to a wheel cylinder of a both end open end type having the shoe gap adjusting device at each end. Further, it is of course that the present invention may also be applied to a drum brake which is not provided with an automatic shoe gap adjusting device.

Figure 4:
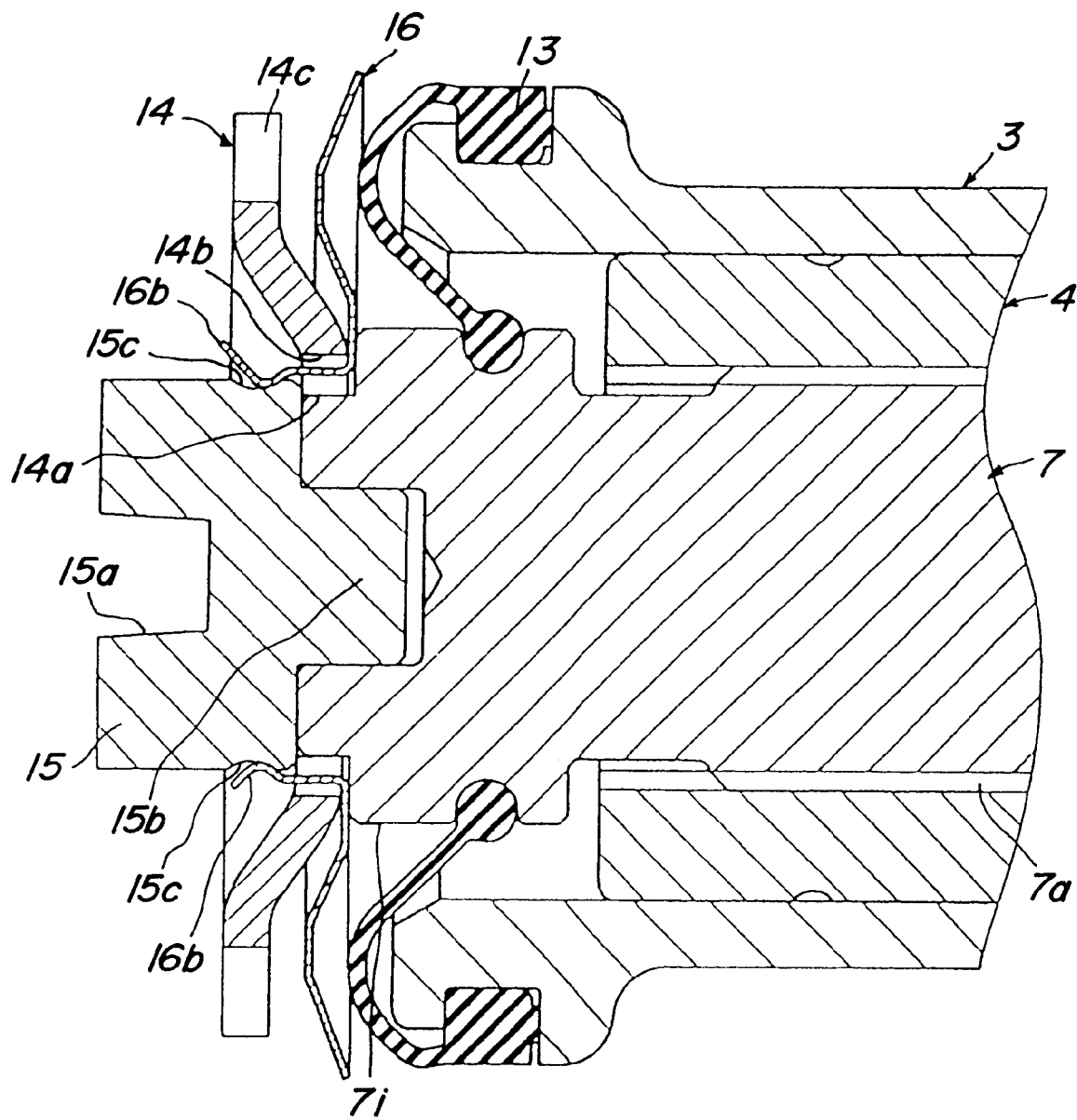
FIG. 4 is an enlarged sectional view illustrating the characteristic part in the shoe gap adjusting device according to a second embodiment of the present invention.
Figure 5:
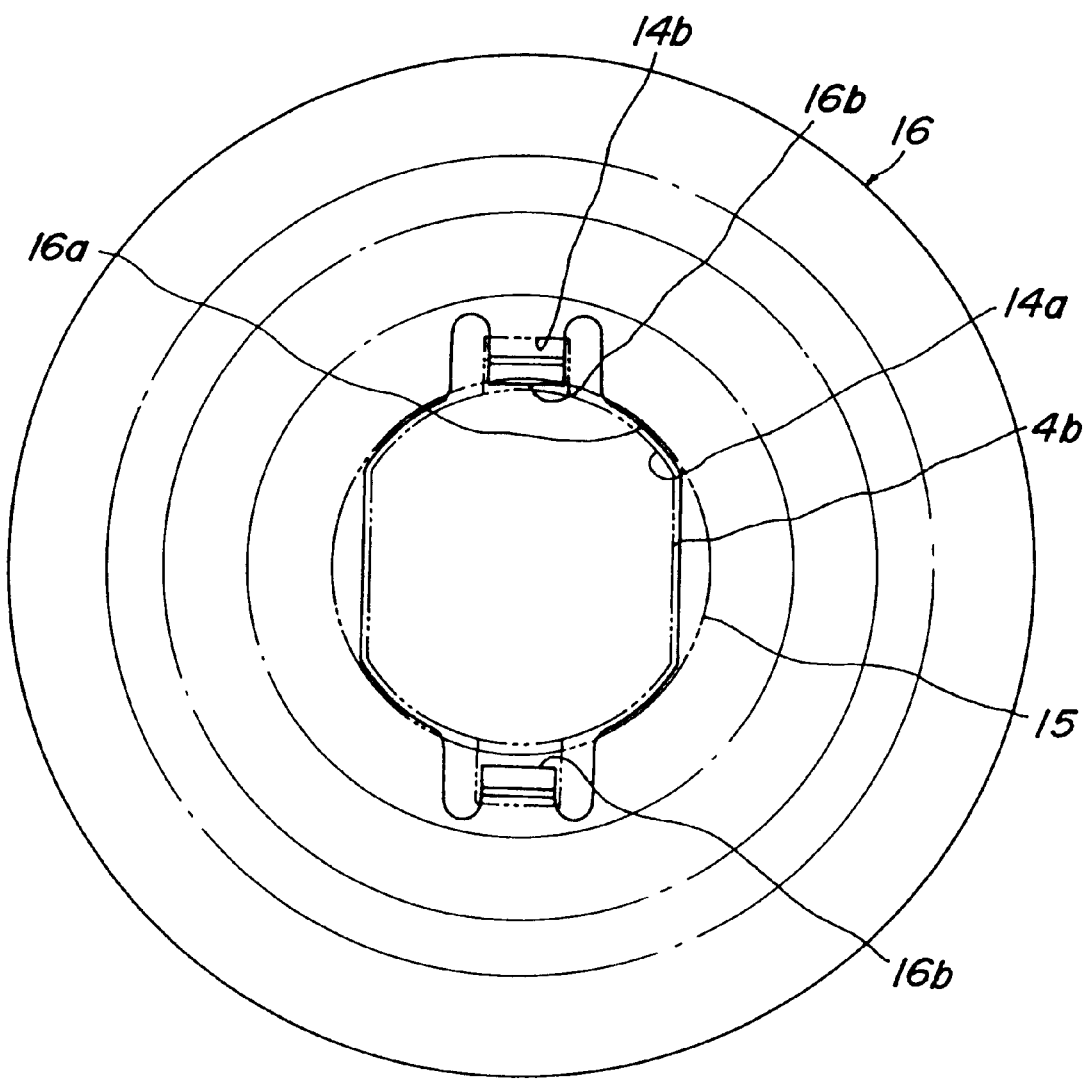
FIG. 5 is a front view similar to FIG. 2a, showing a protecting cover for protecting an elastic boot which may be used in the shoe gap adjusting device according to a third embodiment of the present invention.

There is shown in FIG. 4 a second embodiment of the present invention wherein the shoe gap adjusting device according to the present invention is applied to a drum brake in which the brake shoe is pushed by the adjusting bolt 7, instead of the piston 4, in such a manner that the shoe gap can be manually adjusted by rotating the adjusting bolt 7.

The elastic boot 13 is provided so as to seal between the projecting end part 7i of the adjusting bolt 7 which projects from the brake actuating piston 4 and the open end of the cylinder body 3, so as to block the open end of the cylinder body 3 and thereby prevent intrusion of dust, muddy water or the like foreign matters into the cylinder body 3.

Further, the projecting end part 7i of the adjusting bolt 7 is provided with the shoe gap adjusting ring 14 for rotating the adjusting bolt 7 so as to adjust the shoe gap, the shoe engaging member 15 (which bears the same reference numeral "15" since it functions in the same way as the piston head 15), as well as the boot cover 16 as a protecting member for protecting the elastic boot 13.

Accordingly, the second embodiment shown in FIG. 4 has essentially the same basic configuration as the previously explained first embodiment, except that it is attached to the adjusting bolt 7 instead of the end part 4a of the piston 4. Thus, a further detailed explanation of the second embodiment has been omitted in order avoid superfluous description.

In the second embodiment, however, it is to be noted that a recess 15c for receiving the elastic pieces 16b of the boot cover 16 is formed specifically in the outer peripheral surface of the shoe engaging member 15 so as to increase the holding force of the shoe engaging member 15 by the elastic pieces 16b.

Further, with reference to any of the first and second embodiments, a further modification is possible. Thus, by referring to the first embodiment, by way of example, the non-circular hole 14a of the shoe gap adjusting ring 14 may fitted onto the non-circular tip end 4b of the piston 4 in a press-fitting manner. In this instance, the shoe gap ring 14 and the boot cover 16 can be handled as an integral unit before the piston head 15 is attached, and they can be handled in such a condition wherein the piston head 5 is attached to the piston 4.

It is noted that another fixing method such as a welding method may be used, instead of the press-fitting of the non-circular hole 14 onto the non-circular front end 4b as mentioned above. Such a fixing method serves to eliminate the necessity for the non-rotatable fitting by the non-circular components for the fitting of the shoe gap adjusting ring 14 onto the tip end 4b of the piston 4, and is thus preferable to realize a facilitated manufacturing process.

Moreover, instead of fixing the shoe gap adjusting ring 14 to the tip end 4b of the piston 4 as mentioned above, the same effect in terms of assembly can be obtained even when the boot cover 16 is fixed to the tip end 4b of the piston 4. It is of course that both of the shoe gap adjusting ring 14 and the boot cover 16 may be secured to the tip end 4b of the piston 4.

While the present invention has been explained above with reference to certain preferred embodiments illustrated in the accompanying drawings and/or explained above, these embodiments were presented by way of example only, without in anyway limiting the present invention. It is of course that the present invention can be practiced in various modes within the scope thereof.

What is claimed is:

1. A shoe gap adjusting device for a drum brake comprising:

a shoe pressing member incorporated in a cylinder body and having a projecting end part adapted to extend from an adjacent opening in the cylinder body for pressing a brake shoe and effecting a braking action;

an elastic boot covering between the projecting end part of the shoe pressing member and the opening in the cylinder body;

a protecting member for protecting the elastic boot, provided for the projecting end part of the shoe pressing member adjacent to the elastic boot;

a shoe engaging member non-rotatably engaged with the brake shoe, and abutting against and journalled by a tip end face of the projecting end part of the shoe pressing member so as to be relatively rotatable;

a shoe gap adjusting ring provided in the tip end of the projecting end part of the shoe pressing member, so as to be manually rotated for changing an angular position of the shoe pressing member relative to the cylinder body and thereby adjusting the shoe gap;

said shoe engaging member being elastically supported by an elastic support piece which is formed integrally with the protecting member.

2. A shoe gap adjusting device according to claim 1, wherein the shoe gap adjusting ring is fitted on the tip end of the projecting end part of the said shoe pressing member in a non-rotating manner, and the shoe gap adjusting ring has a detent fitting hole with a cut-out through which the elastic piece of the protecting member extends to an elastically supporting position of the shoe engaging member.

3. A shoe gap adjusting device according to claim 1, wherein the shoe engaging member is fitted with the tip end face of the projecting end part of the shoe pressing member in a form-locking manner so as to be relatively rotatable and radially positioned such that a radial pressing force exerted by the elastic piece of the shoe pressing member is increased in a predetermined radial direction.

4. A shoe gap adjusting device according to claim 1, wherein a recess is formed in the outer peripheral surface of the shoe engaging member, for receiving the elastic piece of the protecting member therein.

5. A shoe gap adjusting device according to claim 1, wherein at least one of the shoe gap adjusting ring and the protecting member is secured to the projecting end part of the shoe pressing member.

6. A shoe gap adjusting device according to claim 1, wherein the shoe pressing member comprises a brake actuating piston which is slidably fitted in said cylinder body.

7. A shoe gap adjusting device according to claim 1, wherein the shoe pressing member comprises a shoe gap adjusting bolt threaded into a brake actuating piston which is slidably fitted in said cylinder body.

8. A shoe gap adjusting device according to claim 1, further comprising an automatic shoe gap adjusting mechanism incorporated in the cylinder body.

* * * * *